(12) United States Patent
Buller

(10) Patent No.: US 6,798,883 B1
(45) Date of Patent: Sep. 28, 2004

(54) METHOD OF TESTING A RANDOMIZER

(75) Inventor: Darryl M. Buller, Severn, MD (US)

(73) Assignee: The United States of America as represented by the National Security Agency, Washington, DC (US)

( * ) Notice: Subject to any disclaimer, the term of this patent is extended or adjusted under 35 U.S.C. 154(b) by 1223 days.

(21) Appl. No.: 09/662,385

(22) Filed: Sep. 18, 2000

(51) Int. Cl.$^7$ .............................. G06F 7/58; H04K 1/00; H04L 9/26
(52) U.S. Cl. .............................. 380/2; 380/44; 380/46; 380/59; 708/250
(58) Field of Search .............................. 380/2, 259–266, 380/277, 278, 44–47, 28–30, 287, 59; 713/150–152, 164–167, 189, 200, 201, 202; 708/200, 250–256

(56) References Cited

U.S. PATENT DOCUMENTS

| | | | |
|---|---|---|---|
| 4,977,596 A | | 12/1990 | Maestas et al. |
| 5,581,561 A | | 12/1996 | Luckett |
| 5,623,545 A | * | 4/1997 | Childs et al. .................. 380/2 |
| 6,061,703 A | * | 5/2000 | DeBellis et al. ............ 708/254 |
| 6,076,097 A | | 6/2000 | London et al. |

\* cited by examiner

*Primary Examiner*—Bernarr E. Gregory
(74) *Attorney, Agent, or Firm*—Robert D. Morelli

(57) ABSTRACT

A method of testing a randomizer having at least one source of probabilistic data and a device for mixing the probabilistic data to form random data, where the probabilistic data includes at least two states, by receiving a probability of occurrence of each of the at least two states in the probabilistic data; squaring each probability of occurrence; generating a row vector a of the results of the last step; receiving a probability of transition between each of the at least two states in the probabilistic data; squaring the transition probabilities; generating a matrix B of the results of the last step; generating a column vector c having entries equal in number to the at least two states in the probabilistic data, where each entry is 1; computing $S(P)=a(B^{(L-1)})c$ for each at least one source of probabilistic data, where L is a number of outputs of probabilistic data processed by the randomizer to produce m bits of output; if the at least one source of probabilistic data is greater than 1 then generating a product of the results of the last step and designating the product as S(P); computing $S(Q)=(\frac{1}{2}^m)[1+(2^m-1)S(P)]$; and declaring the randomizer acceptable if S(Q) is below a user-definable value, otherwise declaring the randomizer unacceptable.

3 Claims, 3 Drawing Sheets

US 6,798,883 B1

METHOD OF TESTING A RANDOMIZER

(U) FIELD OF THE INVENTION (U) The present invention relates, in general, to measuring and testing and, in particular, to testing of apparatus (i.e., a randomizer).

(S) BACKGROUND OF THE INVENTION (U) The operation of a wide range of devices is based on a number that should not be easy to predict (e.g., lottery devices, cryptographic devices, etc.). An owner of a lottery device makes money by luring players to wager a small amount of money in hopes of winning a large amount of money. If the number of lottery winners exceeds a certain percentage of the players, where the percentage is based on wager amount and prize value, then the owner loses money. If the output of the lottery device is hard to predict then fewer players will win and the owner profits by keeping a higher percentage of the wagers. This analysis applies by analogy to a cryptographic device, but the stakes may be much higher (e.g., personal security, national security, etc.).

(U) A number that is generated in a manner that is truly random is a number that is independent of any other number that is generated. In other words, any number that is produced by a device that generates numbers that are truly random generates numbers where any number produced is just as likely to be produced as any other number. That is, no number is more likely to be produced than any other number. Therefore, someone cannot predict with more certainty than a guess what the next number will be based on previously generated numbers. There is always a chance, or probability, that a person will guess correctly. The probability may be lowered, or reduced to nearly zero, by increasing the range from which the number is generated. For example, it is more difficult to guess a number in the range of 1 to 100 than 1 to 10. However, increasing the number range increases the complexity and cost of the device. So, the designer should use the widest range of numbers that is appropriate for the application. A wider range of numbers will be used in a cryptographic device used to protect sensitive information than in a lottery device for a low dollar prize.

(U) A device that attempts to produce a random number is often referred to as a randomizer. Typically, randomizers rely on one or more sources of random data (e.g., timing of random events as compared to a threshold, random natural processes, etc.). The sources of random data are typically connected to a scrambling device that mixes the random data in some complex fashion to achieve a degree of uniformity in the distribution of the output of the randomizer. Typically, randomizers produce an m-bit block of random data.

(U) Pseudo-random number generators are not based on a source of random data but on a deterministic function that is believed to be adequate in both complexity and cycle length for the proposed application. (e.g., screen-saver movements, games of chance for entertainment, etc.).

(S) To insure that a randomizer produces outputs that are sufficiently random, the outputs are typically tested by either estimating the entropy present in the outputs, performing statistical tests on the outputs, or both. There are several different mathematical definitions for entropy which produce different results. Statistical tests are good at determining whether or not a randomizer is bad but not whether or not a randomizer is good. That is, failing a statistical test (e.g., percentage of ones and zeros, frequency of occurrence of a particular pattern, etc.) indicates that the randomizer is not producing random bits, but passing the statistical test does not, necessarily, indicate that the output is sufficiently random for the proposed application. The present invention is a method of testing a randomizer in a manner that is not based on estimating entropy or traditional statistical tests.

(U) U.S. Pat. No. 4,977,596, entitled "CRYPTO-GRAPHIC SYNCHRONIZATION RECOVERY BY MEASURING RANDOMNESS OF DECRYPTED DATA," discloses a device for and method of determining whether or not two cryptographic devices that are communicating with one another are in synchronization by performing a statistical test of ones density (i.e., the percentage of ones and zeros) at the output of the decryptor. The present invention does not rely solely on the ones density statistical test to determine if the output of a randomizer is sufficiently random. U.S. Pat. No. 4,977,596 is hereby incorporated by reference into the specification of the present invention.

(U) U.S. Pat. No. 5,581,561, entitled "RANDOM BIT DIAGNOSTIC FOR A HIGH RESOLUTION MEASUREMENT SYSTEM," discloses a device for and method of determining whether or not a bit of a word is stuck at a zero or a one by logically combining test words with the output. The present invention does not employ the method of U.S. Pat. No. 5,581,561. U.S. Pat. No. 5,581,561 is hereby incorporated by reference into the specification of the present invention.

(U) U.S. Pat. No. 6,076,097, entitled "SYSTEM AND METHOD FOR GENERATING RANDOM NUMBERS," discloses a device for and method of producing random data from one source of random data, mixing the random data, and performing chi-squared and compression tests on the data to determine if the data is sufficiently random. The present invention does not rely on chi-squared and compression tests to determine if the output of a randomizer is sufficiently random. U.S. Pat. No. 6,076,097 is hereby incorporated by reference into the specification of the present invention.

(U) SUMMARY OF THE INVENTION (U) It is an object of the present invention to test the sufficiency of an output of a randomizer that is based on at least one source of random data.

(S) It is another object of the present invention to test the sufficiency of an output of a randomizer that is based on at least one source of random data by determining the probability that an output of the randomizer will reoccur.

(S) It is another object of the present invention to test the sufficiency of an output of a randomizer that is based on at least one source of random data by determining the minimum number of guesses one would expect to have to make to correctly determine an output of the randomizer.

(S) It is another object of the present invention to test the sufficiency of an output of a randomizer that is based on at least one source of random data by determining the probability that an output of the randomizer will reoccur and by determining the minimum number of guesses one would expect to have to make to correctly determine an output of the randomizer.

(S) The first step of the method is receiving, for each source of probabilistic data in a randomizer, a probability of occurrence of each possible state of the source of probabilistic data.

(S) The second step of the present method is raising each result of the first step to a power of two.

(S) The third step of the present method is generating a row vector a that includes the results of the second step.

(S) The fourth step of the present method is receiving the probability that each possible state transitions to each of the other possible states.

(S) The fifth step of the present method is raising each result of the fourth step to a power of two.

(S) The sixth step of the present method is generating a matrix B that includes the results of the fifth step, where each row of B represents one of the possible states from which a transition is made, where each column of B represents one of the possible states to which a transition is made, and where each numerical entry in B represents the square of the transition probability from the state represented by the row to the state represented by the column for which the entry intersects.

(S) The seventh step of the present method is generating a column vector c, where the number of entries in c is equal to the number of possible states in the probabilistic data, and where each entry in c is a one.

(S) The eighth step of the present method is computing $S(P)=a(B^{(L-1)})c$ for each at least one source of probabilistic data, where L is a number of outputs of probabilistic data processed by the probabilistic randomizer to produce m bits of output.

(S) If there are more than one result in the eighth step, then the ninth step of the present method is forming a product of all of the results of the eighth step and calling the result S(P). If there is only one result produced in the eighth step, then S(P) remains as defined in the eighth step.

(S) The tenth step of the present method is computing $S(Q)=(½^m)[1+(2^m-1)S(P)]$. S(Q) is the probability that the randomizer produces the same m-bit output block at two arbitrary times.

(S) The eleventh step of the present method is declaring the probabilistic randomizer acceptable if S(Q) is below a user-definable value. Otherwise, declaring the probabilistic randomizer unacceptable.

(S) In alternate embodiment of the present method, the first ten steps of the method described above are performed along with the following steps: comparing $2^m$ and $4/(3S(Q))$ and setting x to whichever is smallest; computing $W(Q)=(⅙)[3x+3-(3(x^2-1)(xS(Q)-1))^{0.5}]$; and declaring the probabilistic randomizer acceptable if W(Q) is above a user-definable value, otherwise, declaring the probabilistic randomizer unacceptable.

(S) In a second alternate embodiment of the present method, the first twelve steps of the alternate embodiment are performed along with the step of declaring the probabilistic randomizer acceptable if S(Q) is below a user-definable value and W(Q) is above a user-definable value, otherwise declaring the probabilistic randomizer unacceptable.

(U) BRIEF DESCRIPTION OF THE DRAWINGS (U) FIG. 1 is a list of the steps of the present method;

Figure 1:
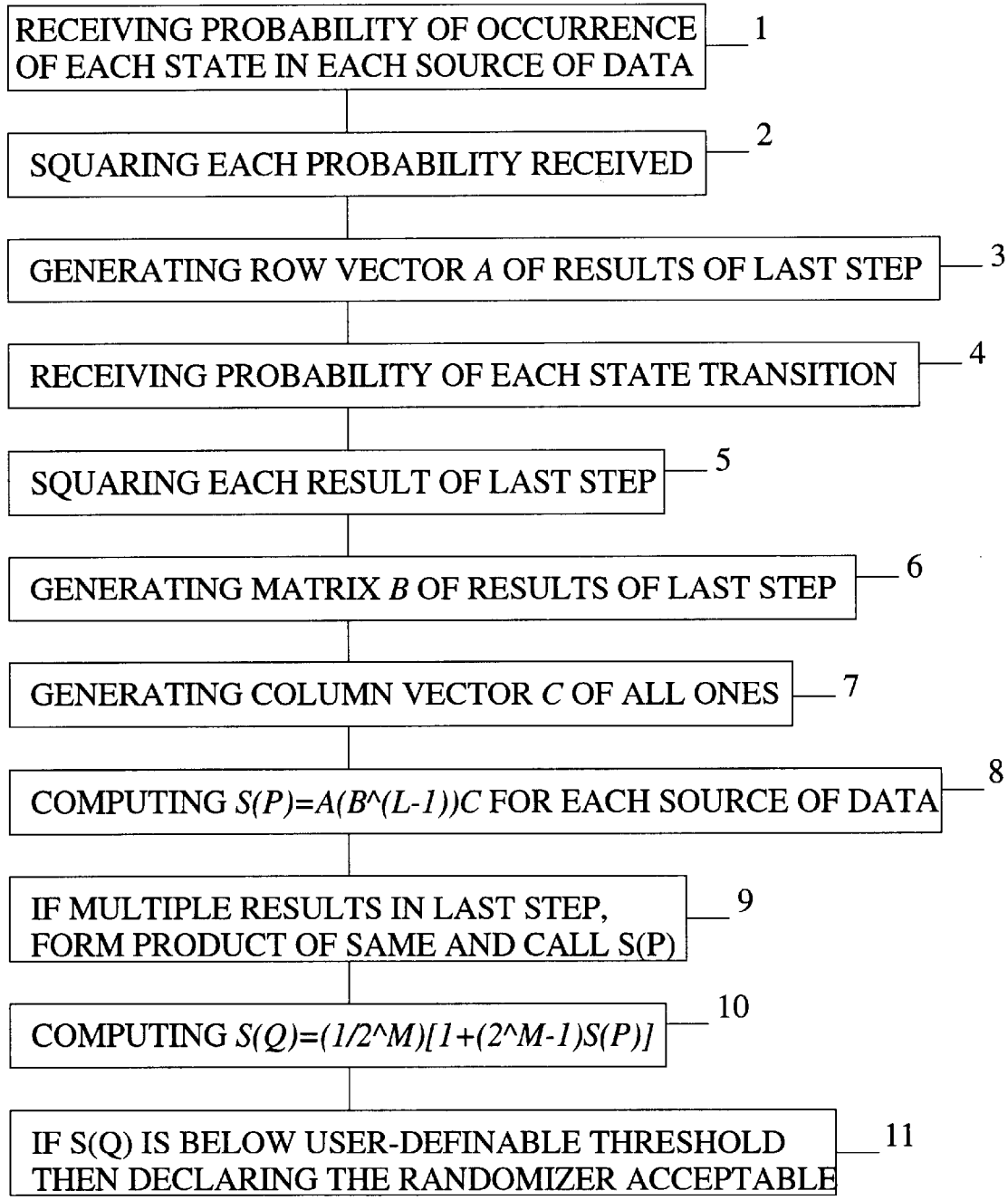

(U) DETAILED DESCRIPTION (S) FIG. 1 is a list of steps of the present method of testing a randomizer. The randomizer under test must be probabilistic in nature and not deterministic as is a pseudo-random number generator. That is, probability theory should be the only avenue for analyzing the outputs. Typically, such randomizers include at least one source of probabilistic data (which is hoped to be random) and a mixing function for uniformly distributing the data from the random sources. The number of states produced by a probabilistic source should be at least two (e.g., 0 and 1 for a binary source). However, the number of states may be greater than two (e.g., multi-bit outputs). Typically, each output of a randomizer is an m-bit block. One source of probabilistic data having four output states (i.e., 00, 01, 10, and 11) will be used to illustrate the present method. The present invention is applicable to randomizers having any number of output states, where each output state may be represented in any manner.

(S) The first step 1 of the present method is receiving, for each source of probabilistic data in the randomizer, a probability of occurrence of each possible state of the source of probabilistic data. The state probabilities may be given to the user or the user may have to generate them. If the user has to generate the state probabilities, one way of doing this is to operate the randomizer for a user-definable period of time and, based on the output of each source of probabilistic data in the randomizer, determine the probability of occurrence of each possible state of each source of probabilistic data. In the example, assume that the probability of occurrence of the four states identified above are 0.4413, 0.2682, 0.0915, and 0.199, respectively.

(S) The second step 2 of the present method is raising each result of the first step 1 to a power of two. In the example, the second step 2 produces $0.4413^2=0.1947$, $0.2682^2=0.0719$, $0.0915^2=0.0084$, and $0.199^2=0.0396$.

(S) The third step 3 of the present method is generating a row vector a that includes the results of the second step 2. In the example, a=(0.1947, 0.0719, 0.0084, 0.0396).

(S) The fourth step 4 of the present method is receiving the probability that each possible state transitions to each of the other possible states. The transition probabilities may be given to the user, or the user may have to determine them. One way of determining the transition probabilities is to run the randomizer for a user-defined period of time and, from the output of each source of probabilistic data in the randomizer, determine the probability that each possible state in a source of probabilistic data transitions to the same state or another possible state of the source of the probabilistic data. In the example, assume that the probabilities that the first state transitions to the first, second, third, and fourth states are 0.4, 0.2, 0.1 and 0.3, respectively; the probabilities that the second state transitions to the first, second, third, and fourth states are 0.6, 0.3, 0.0, and 0.1, respectively; the probabilities that the third state transitions to the first, second, third, and fourth states are 0.7, 0.0, 0.3, and 0.0, respectively; and the probabilities that the fourth state transitions to the first, second, third, and fourth states are 0.2, 0.5, 0.1, and 0.2, respectively.

(S) The fifth step 5 of the present method is raising each result of the fourth step 4 to a power of two. In the example, the transition probabilities squared for the first state are 0.16, 0.04, 0.01, and 0.09, respectively; the transition probabilities squared for the second state are 0.36, 0.09, 0.0, and 0.01, respectively; the transition probabilities squared for the third state are 0.49, 0.0, 0.09, and 0.0, respectively; and the transition probabilities squared for the fourth state are 0.04, 0.25, 0.01, and 0.04, respectively.

(S) The sixth step 6 of the present method is generating a matrix B that includes the results of the fifth step 5, where each row of B represents one of the possible states from which a transition is made, where each column of B represents one of the possible states to which a transition is made, and where each numerical entry in B represents the square of the transition probability from the state represented by the row to the state represented by the column for which the entry intersects. For the above-identified example, B is as follows.

$$B = \begin{bmatrix} 0.16 & 0.04 & 0.01 & 0.09 \\ 0.36 & 0.09 & 0.0 & 0.01 \\ 0.49 & 0.0 & 0.09 & 0.0 \\ 0.04 & 0.25 & 0.01 & 0.04 \end{bmatrix}$$

The present invention applies to a squared-transition matrix B of any size.

(S) The seventh step 7 of the present method is generating a column vector c, where the number or entries in c is equal to the number of possible states in the probabilistic data, and where each entry in c is a one. For the above-identified example, c is as follows.

$$c = \begin{bmatrix} 1 \\ 1 \\ 1 \\ 1 \end{bmatrix}$$

(S) The eighth step 8 of the present method is computing $S(P)=a(B^{(L-1)})c$ for each at least one source of probabilistic data, where L is a number of outputs of probabilistic data processed by the probabilistic randomizer to produce m bits of output. In the example, L is equal to 100 and there is only one source of random data. So, there is only one result, (i.e., $S(P)=6.2\times10^{-46}$). If there were more than one source of random data then a value for S(P) would be generated for each one.

(S) If there are more than one result in the eighth step 8, then the ninth step 9 of the present method is forming a product of all of the results of the eighth step 8 and calling the result S(P). If there is only one result produced in the eighth step 8, then S(P) remains as defined in the eighth step 8.

(S) The tenth step 10 of the present method is computing $S(Q)=(\frac{1}{2}^m)[1+(2^m-1)S(P)]$. S(Q) is the probability that the randomizer produces the same m-bit output block at two arbitrary times. Traditional statistical tests do not provide this probability. In the example, $S(Q)=6.207\times10^{-46}$, assuming that m=160.

(S) The eleventh step 11 of the present method is declaring the probabilistic randomizer acceptable if S(Q) is below a user-definable value. Otherwise, declaring the probabilistic randomizer unacceptable. If S(Q) is above the user-definable value, the design of the randomizer may be changed to process a larger quantity of data from the at least one source of random data. The increased quantity may come from one source of random data, from all of the sources of random data, or from a source of random data that is added to the randomizer.

Figure 2:
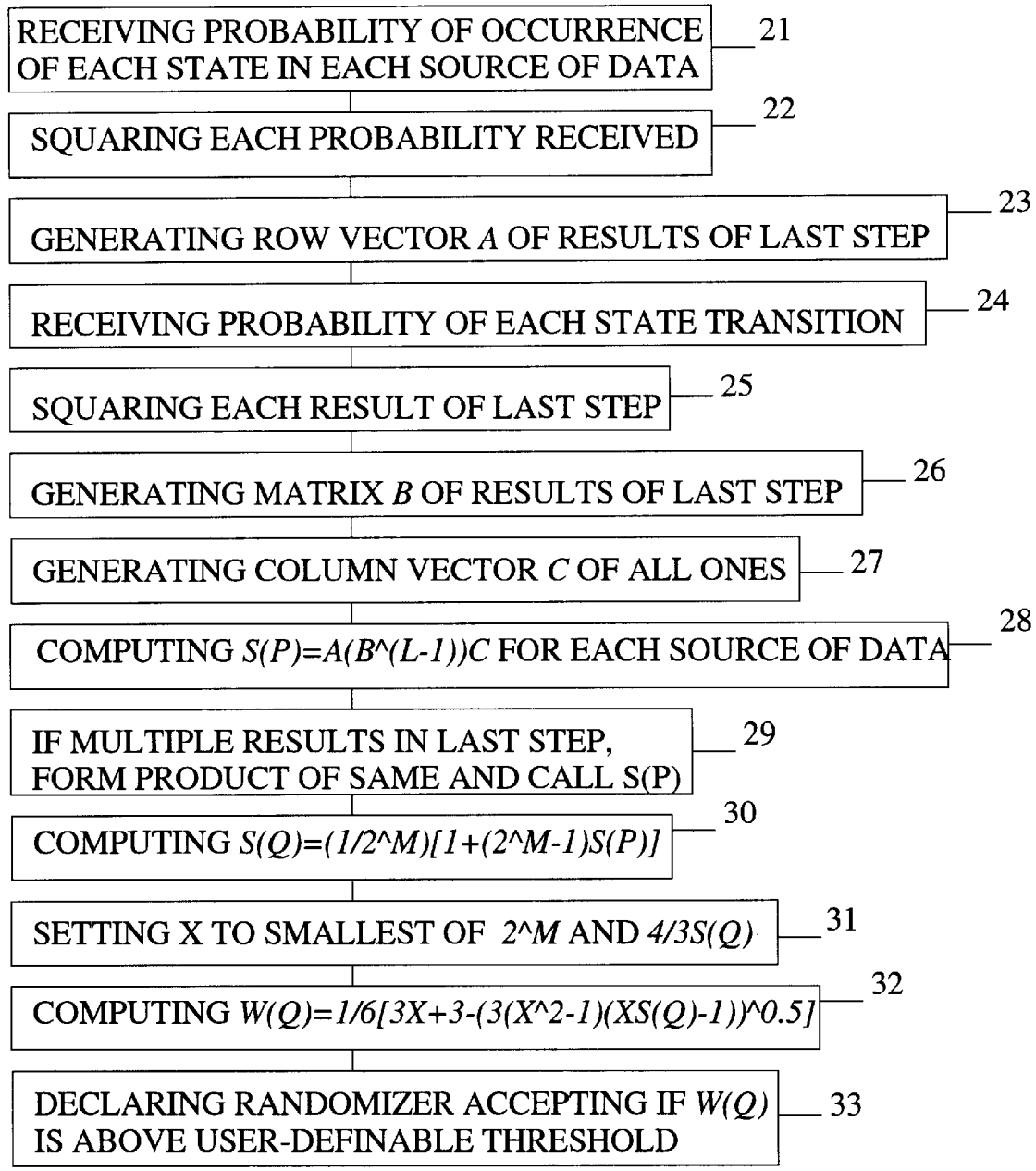
FIG. 2 is a list of the steps of an alternate method.

(S) FIG. 2 is a list of steps of an alternate embodiment of the present method of testing a randomizer. The randomizer under test must be probabilistic in nature as described above that includes at least one source of random data and a mixing function for uniformly distributing the data from the random sources. The number of states produced by a random source should be at least two.

(S) The first step 21 of the alternate method is receiving a probability of occurrence of each possible state of the randomizer under test.

(S) The second step 22 of the alternative method is raising each result of the first step 21 to a power of two.

(S) The third step 23 of the alternate method is generating a row vector a that includes the results of the second step 22.

(S) The fourth step 24 of the alternate method is receiving the probability that each possible state transitions to each of the other possible states. The transition probabilities may be given to the user, or the user may have to determine them.

(S) The fifth step 25 of the alternate method is raising each result of the fourth step 24 to a power of two.

(S) The sixth step 26 of the alternate method is generating a matrix B that includes the results of the fifth step 25, where the rows and columns of B represent the possible states.

(S) The seventh step 27 of the alternate method is generating a column vector c having entries equal in number to the at least two states in the probabilistic data, where each entry in c is a 1.

(S) The eighth step 28 of the alternate method is computing $S(P)=a(B^{(L-1)})c$ for each at least one source of probabilistic data, where L is a number of outputs of probabilistic data processed by the probabilistic randomizer to produce m bits of output.

(S) If there are more than one result in the eighth step 28, then the ninth step 29 of the alternate method is forming a product of all of the results of the eighth step 28 and calling the result S(P). If there is only one result produced in the eighth step 28, then S(P) remains as defined in the eighth step 28.

(S) The tenth step 30 of the alternate method is computing $S(Q)=(\frac{1}{2}^m)[1+(2^m-1)S(P)]$.

(S) The eleventh step 31 of the alternate method is comparing $2^m$ and $4/(3S(Q))$ and setting x to whichever is smallest. In the example, $2^m=2^{160}=1.462\times10^{48}$ and $4/(3S(Q))=2.148\times10^{45}$. Therefore, x would be set to $2.148\times10^{45}$.

(S) The twelfth step 32 of the alternate method is computing $W(Q)=(\frac{1}{6})[3x+3-(3(x^2-1)(xS(Q)-1))^{0.5}]$. W(Q) is the lower bound on the number of guesses one must expect to make to correctly predict an output of the randomizer. In the example, $W(Q)=7.161\times10^{44}$.

(S) The thirteenth step 33 of the alternate method is declaring the probabilistic randomizer acceptable if W(Q) is above a user-definable value. Otherwise, declaring the probabilistic randomizer unacceptable. If W(Q) is below the user-definable value, the design of the randomizer may be changed to process a larger quantity of data from the at least one source of random data. The increased quantity may come from one source of random data, from all of the sources of random data, or from a source of random data that is added to the randomizer.

Figure 3:
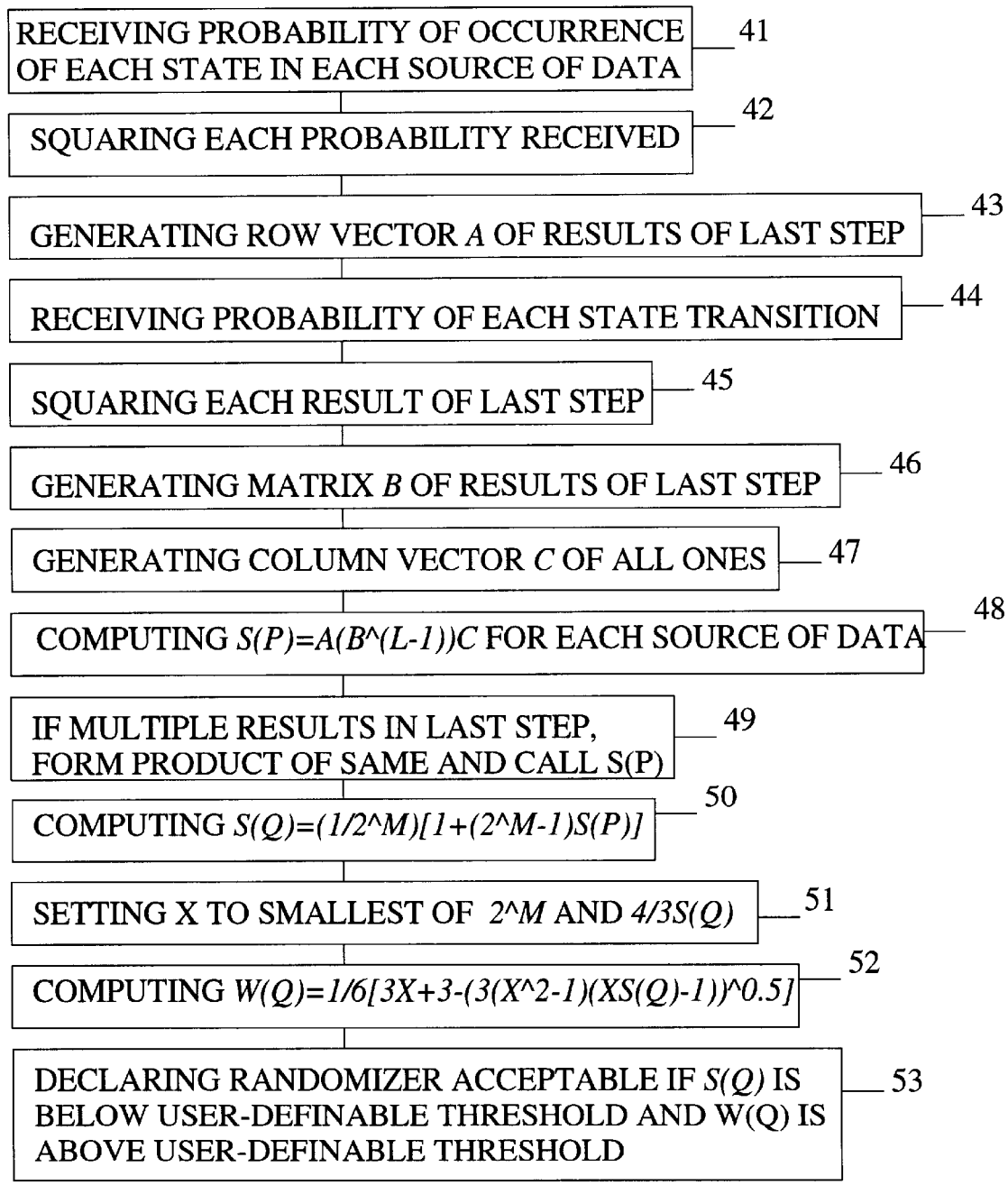
FIG. 3 is a list of the steps of a second alternate method.

(S) FIG. 3 is a list of steps of a second alternate embodiment of the present method of testing a randomizer. The randomizer under test must be probabilistic in nature as described above that includes at least one source of random data and a mixing function for uniformly distributing the data from the random sources. The number of states produced by a random source should be at least two.

(S) The first step 41 of the second alternate method is receiving a probability of occurrence of each possible state of each source of random data in the randomizer under test.

(S) The second step 42 of the second alternative method is raising each result of the first step 41 to a power of two.

(S) The third step 43 of the second alternate method is generating a row vector a that includes the results of the second step 42.

(S) The fourth step 44 of the second alternate method is receiving the probability that each possible state transitions to each of the other possible states. The transition probabilities may be given to the user, or the user may have to determine them (S) The fifth step 45 of the second alternate method is raising each result of the fourth step 44 to a power of two.

(S) The sixth step 46 of the second alternate method is generating a matrix B that includes the results of the fifth step 45, where the rows and columns of B represent the possible states.

(S) The seventh step 47 of the second alternate method is generating a column vector c having entries equal in number to the at least two states in the probabilistic data, where each entry in c is a 1.

(S) The eighth step 48 of the second alternate method is computing $S(P)=a(B^{\wedge}(L-1))c$ for each at least one source of probabilistic data, where L is a number of outputs of probabilistic data processed by the probabilistic randomizer to produce m bits of output.

(S) If there are more than one result in the eighth step 48, then the ninth step 49 of the second alternate method is forming a product of all of the results of the eighth step 48 and calling the result S(P). If there is only one result produced in the eighth step 48, then S(P) remains as defined in the eighth step 48.

(S) The tenth step 50 of the second alternate method is computing $S(Q)=(\frac{1}{2}^{\wedge}m)[1+(2^{\wedge}m-1)S(P)]$.

(S) The eleventh step 51 of the second alternate method is comparing $2^{\wedge}m$ and $4/(3S(Q))$ and setting x to whichever is smallest.

(S) The twelfth step 52 of the second alternate method is computing $W(Q)=(\frac{1}{6}) 5[3x+3-(3(x^{\wedge}2-1)) (xS(Q)-1))^{\wedge}0.5]$.

(S) The thirteenth step 53 of the second alternate method is declaring the probabilistic randomizer acceptable if S(Q) is below a user-definable value and W(Q) is above a user-definable value, otherwise declaring the probabilistic randomizer unacceptable.

What is claimed is:

1. (S) A method of testing a probabilistic randomizer, where said probabilistic randomizer includes at least one source of generating a plurality of probabilistic data and a device for mixing the plurality of probabilistic data to form random data, where the plurality of probabilistic data includes at least two states, comprising the steps of:
    a) receiving a probability of occurrence of each of the at least two states in the plurality of probabilistic data;
    b) raising each result of step (a) to a power of two;
    c) generating a row vector a that includes the results of step (b);
    d) receiving a probability of transition between each of the at least two states in the plurality of probabilistic data;
    e) raising each result of step (d) to a power of two;
    generating a matrix B that includes the results of step (e);
    g) generating a column c vector having entries equal in number to the at least two states in the plurality of probabilistic data, where each entry is 1;
    h) computing $S(P)=a(B^{\wedge}(L-1))c$ for each at least one source of generating a plurality of probabilistic data, where L is a number of outputs of probabilistic data processed by the probabilistic randomizer to produce m bits of output;
    i) if the at least one source of generating a plurality of probabilistic data is greater than 1 then generating a product of the results of step (h) and designating the product as S(P),
    j) computing $S(Q)=(\frac{1}{2}^{\wedge}m)[1+(2^{\wedge}m-1)S(P)]$; and
    k) declaring the probabilistic randomizer acceptable if S(Q) is below a user-definable value, otherwise declaring the probabilistic randomizer unacceptable.

2. (S) A method of testing a probabilistic randomizer, where said probabilistic randomizer includes at least one source of generating a plurality of probabilistic data and a device for mixing the plurality of probabilistic data to form random data, where the plurality of probabilistic data includes at least two states, comprising the steps of:
    a) receiving a probability of occurrence of each of the at least two states in the plurality of probabilistic data;
    b) raising each result of step (a) to a power of two;
    c) generating a row vector a that includes the results of step (b);
    d) receiving a probability of transition between each of the at least two states in the plurality of probabilistic data;
    e) raising each result of step (d) to a power of two;
    f) generating a matrix B that includes the results of step (e);
    g) generating a column vector c having entries equal in number to the at least two states in the plurality of probabilistic data, where each entry is 1;
    h) computing $S(P)=a(B^{\wedge}(L-1))c$ for each at least one source of generating a plurality of probabilistic data, where L is a number of outputs of probabilistic data processed by the probabilistic randomizer to produce m bits of output;
    i) if the at least one source of generating a plurality of probabilistic data is greater than 1 then generating a product of the results of step (h) and designating the product as S(P),
    j) computing $S(Q)=(\frac{1}{2}^{\wedge}m)[1+(2^{\wedge}m-1)S(P)]$;
    k) comparing $2^{\wedge}m$ and $4/(3S(Q))$ and setting x to whichever is smallest;
    l) computing $W(Q)=(\frac{1}{6})[3x+3-(3(x^{\wedge}2-1)(xS (Q)-1))^{\wedge}0.5]$; and
    m) declaring the probabilistic randomizer acceptable if W(Q) is above a user-definable value, otherwise declaring the probabilistic randomizer unacceptable.

3. A method of testing a probabilistic randomizer, where said probabilistic randomizer includes at least one source of generating a plurality of probabilistic data and a device for mixing the plurality of probabilistic data to form random data, where the plurality of probabilistic data includes at least two states, comprising the steps of:
    a) receiving a probability of occurrence of each of the at least two states in the plurality of probabilistic data;
    b) raising each result of step (a) to a power of two;
    c) generating a row vector a that includes the results of step (b);
    d) determining a probability of transition between each of the at least two states in the plurality of probabilistic data;
    e) raising each result of step (d) to a power of two;
    f) generating a matrix B that includes the results of step (e);
    g) generating a column vector c having entries equal in number to the at least two states in the plurality of probabilistic data, where each entry is 1;
    h) computing $S(P)=a(B^{\wedge}(L-1))c$ for each at least one source of generating a plurality of probabilistic data, where L is a number of outputs of probabilistic data processed by the probabilistic randomizer to produce m bits of output;
    i) if the at least one source of generating a plurality of probabilistic data is greater than 1 then generating a product of the results of step (h) and designating the product as S(P);

j) computing $S(Q)=(\frac{1}{2}^m)[1+(2^m-1)S(P)]$;

k) comparing $2^m$ and $4/(3S(Q))$ and setting x to whichever is smallest;

l) computing $W(Q)=(\frac{1}{6}) [3x+3-(3(x^2-1)(xS(Q)-1))^{0.5}]$; and declaring the probabilistic randomizer acceptable if S(Q) is below a user-definable value and W(Q) is above a user-definable value, otherwise declaring the probabilistic randomizer unacceptable.

* * * * *